United States Patent
Ahn

(10) Patent No.: US 12,415,491 B2
(45) Date of Patent: Sep. 16, 2025

(54) PUMP HOUSING LAYOUT FOR BRAKE SYSTEM

(71) Applicant: HYUNDAI MOBIS CO., LTD., Seoul (KR)

(72) Inventor: Sung Ki Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 362 days.

(21) Appl. No.: 17/736,162

(22) Filed: May 4, 2022

(65) Prior Publication Data

US 2022/0379860 A1 Dec. 1, 2022

(30) Foreign Application Priority Data

May 25, 2021 (KR) .................. 10-2021-0067080

(51) Int. Cl.
| | |
|---|---|
| B60T 8/40 | (2006.01) |
| B60T 13/14 | (2006.01) |
| B60T 13/66 | (2006.01) |
| B60T 17/22 | (2006.01) |

(52) U.S. Cl.
CPC .......... *B60T 13/148* (2013.01); *B60T 8/4031* (2013.01); *B60T 13/66* (2013.01); *B60T 17/22* (2013.01)

(58) Field of Classification Search
CPC ...... B60T 8/4031; B60T 13/66; B60T 13/148; B60T 17/22
See application file for complete search history.

(56) References Cited

U.S. PATENT DOCUMENTS

| | | | | |
|---|---|---|---|---|
| 5,123,819 | A * | 6/1992 | Schuller | F04B 53/102 137/543.17 |
| 2003/0047993 | A1* | 3/2003 | Furuya | B60T 8/4031 303/116.4 |
| 2004/0075339 | A1* | 4/2004 | Volz | G01P 3/443 303/116.4 |
| 2006/0284477 | A1* | 12/2006 | Yang | B60T 8/4031 303/10 |
| 2007/0289442 | A1* | 12/2007 | Waller | B60T 8/4031 92/172 |
| 2008/0147272 | A1* | 6/2008 | Kamiya | B60T 17/02 701/38 |
| 2013/0064699 | A1* | 3/2013 | Grethel | F04C 2/18 417/410.3 |
| 2016/0010645 | A1* | 1/2016 | Hashiba | B60T 17/02 418/140 |
| 2018/0269751 | A1* | 9/2018 | Foerch | H02K 7/14 |
| 2019/0100172 | A1* | 4/2019 | Lee | B60T 7/042 |

(Continued)

*Primary Examiner* — Nicholas J Lane
(74) *Attorney, Agent, or Firm* — NovoTechIP International PLLC

(57) ABSTRACT

According to at least one embodiment, the present disclosure provides a pump system for a brake system, comprising: an oil reservoir; a pump housing having a suction port and a discharge port formed therein; a motor disposed at a side of the pump housing; an electronic control unit disposed at another side of the pump housing; a pump installed in the pump housing and having a suction channel, which is connected with the suction port, and a discharge port, which is connected with the discharge port, therein; a shaft coupled to the motor to rotate and having a rotating body configured to operate the pump; and a pump-reservoir pipeline configured to connect the suction channel to the oil reservoir.

7 Claims, 5 Drawing Sheets

(56) References Cited

U.S. PATENT DOCUMENTS

| | | | |
|---|---|---|---|
| 2019/0140523 A1* | 5/2019 | Schlitzkus | H02K 11/21 |
| 2022/0041150 A1* | 2/2022 | Leiber | B60T 13/12 |
| 2023/0242086 A1* | 8/2023 | Suarez-Seminario | B60T 17/00 303/121 |
| 2023/0356704 A1* | 11/2023 | Jerchen | H02K 7/003 |

* cited by examiner

PUMP HOUSING LAYOUT FOR BRAKE SYSTEM

CROSS-REFERENCE TO RELATED APPLICATIONS

This application claims priority to and the benefit of Korean Patent Application No. 10-2021-0067080, filed on May 25, 2021, the disclosure of which is incorporated herein by reference in its entirety.

BACKGROUND

1. Technical Field

The present disclosure relates to a pump housing layout for a brake system. In more detail, the present disclosure relates to a pump housing layout for a brake system employing a BLAC (Brushless Alternating Current) motor.

2. Discussion of Related Art

Description of this section only provides the background information of the present disclosure without configuring the related art.

A brake system of a vehicle includes a motor to secure a braking force that is required to stop or decelerate a vehicle. A DC (Direct Current) motor is mounted on several brake devices to implement ABS (Anti-lock Brake System) or an ESC (Electronic stability control).

However, a DC motor is not suitable for performing additional functions that should be always performed because operation noise due to an RPM change is large. There is an alternative plan of using a BLAC (Brushless Alternating Current) motor of which noise is small instead of a DC motor. However, when a BLAC motor is used, there is a problem in that it is possible to additionally secure an installation space in a vehicle in order to install a device for sensing the rotational position of a shaft coupled to the motor to rotate.

FIG. 1 is a cross-sectional view showing an ABS module equipped with a BLAC motor in the related art.

Referring to FIG. 1, a pump housing layout that prevents an increase in installation space of a brake device by coupling a sensed component 150 to an end of a shaft 110 extending to an electronic control unit 130 and installing a sensor 170 for sensing rotation of the sensed component 150 at a position facing the sensed component 150 on the electronic control unit 130 has been proposed in order to solve this problem.

However, such a pump housing layout has another problem that when a working liquid leaks from a pump operating while being in contact with a rotary member coupled to the shaft, the leaking working fluid flows to the electronic control unit due to the extending shaft and causes mechanical breakdown.

SUMMARY

According to at least one embodiment, the present disclosure provides a pump housing layout for a brake system, comprising: an oil reservoir; a pump housing having a suction port and a discharge port formed therein; a motor disposed at a side of the pump housing; an electronic control unit disposed at another side of the pump housing; a pump installed in the pump housing and having a suction channel, which is connected with the suction port, and a discharge port, which is connected with the discharge port, therein; a shaft coupled to the motor to rotate and having a rotating body configured to operate the pump; and a pump-reservoir pipeline configured to connect the suction channel to the oil reservoir.

DETAILED DESCRIPTION

Figure 1:
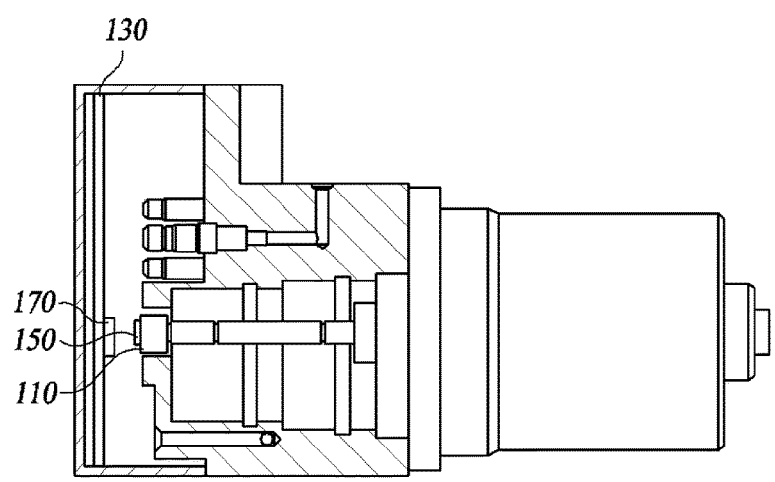
FIG. 1 is a cross-sectional view showing an ABS module equipped with a BLAC motor in the related art.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit,' 'module,' and the like refer to one or more units for processing at least one function or operation, which may be implemented by hardware, software, or a combination thereof.

Accordingly, the present disclosure has been made to solve the problems described above and a main object is to provide a pump housing layout (or a pump system) for a brake system that prevents a working fluid from leaking to an electronic control unit from a pump housing by connecting a suction channel of a pump to an oil reservoir.

The objects of the present disclosure are not limited to the objects described above and other objects will be clearly understood by those skilled in the art from the following description.

A pump housing layout for a brake system according to an embodiment of the present disclosure includes all or some of an oil reservoir 210, a pump housing 220, a motor 230, an electronic control unit 411, a shaft 250, a pump 240, a pump-reservoir pipeline 270, a sensed component 260, a sensor 320, and a cover 500.

The oil reservoir 210, which is a storage unit configured to store or supply a working fluid of the brake system, may be connected with a master cylinder (not shown), a pedal simulator (not shown), and a pump 240.

Figure 2:
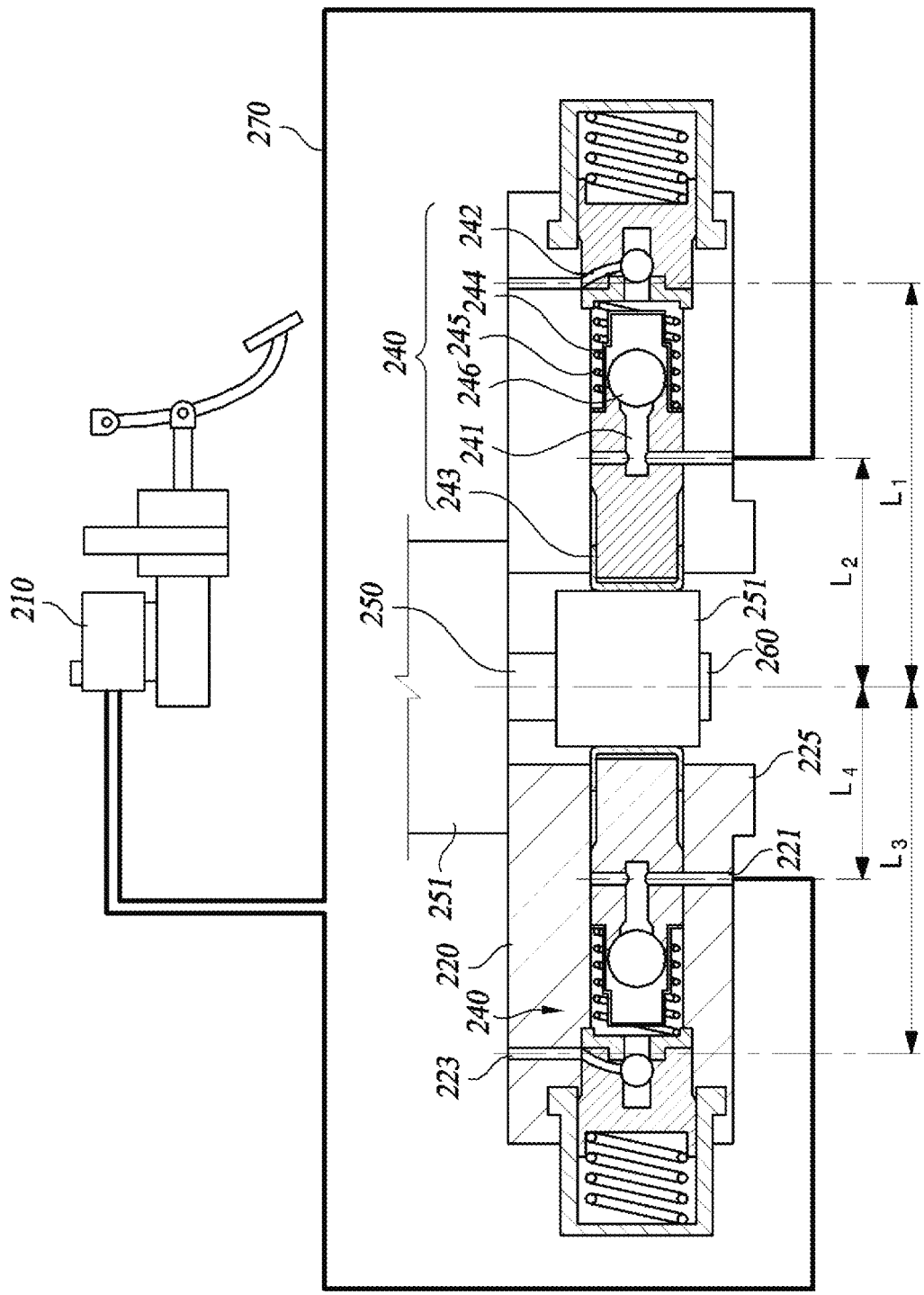
FIG. 2 is a cross-sectional view showing an oil-reservoir pipeline of a pump housing layout for a brake system according to an embodiment of the present disclosure.

Referring to FIG. 2, the oil reservoir 210 according to an embodiment of the present disclosure is connected with a suction channel 241 of the pump 240 by the pump-reservoir pipeline 270. Since the suction channel 241 of the pump 240 and the oil reservoir 210 are connected such that fluid can flow, a working fluid pressurized by operation of the pump 240 can be guided to the oil reservoir 210. Accordingly, there is an effect that it is possible to prevent a working fluid from leaking from the pump 240 and flowing to the shaft 250 due to high pressure. The pump-reservoir pipeline 270 may be a hose made of a flexible material in order not to be damaged or loosened by hitting against other parts of a vehicle.

The motor 230 is disposed at a side of the pump housing 220 and an ECU housing 410 is disposed at another side of the pump housing 220. An electronic control unit 411 and a portion of a solenoid valve are accommodated in the ECU housing 410.

A suction port 221 and a discharge port 223 are formed in the pump housing 220 according to an embodiment of the present disclosure. The suction port 221 and the discharge port 223 are connected with a suction channel 241 and a discharge channel 242 of the pump 240, respectively. The pump 240 is installed in the pump housing 220 and the pump 240 includes pistons 243 at both sides which are reciprocated by the motor 230, etc. When the suction channel 241 formed in the piston 243 is selectively connected with the suction port 221 formed in the pump housing 220 by reciprocation of the piston 243 installed in the pump housing 220, oil flowing from an accumulator (not shown) can flow into the suction channel 241 through the suction port 221, can be pressed by operation of the piston 243, and then can be discharged to the discharge port 223 formed in the pump housing 220.

The motor 230 is disposed at a side of the pump housing 220. The motor 230 provides rotation power for operating the pump 240 by being operated by power. The motor 230 according to an embodiment of the present disclosure may be a BLAC (Brushless Alternating Current) motor. The BLAC motor is a brushless motor having a sinusoidal back electromotive force. The BLAC motor includes a rotor and a stator installed around the rotor without a brush and a commutator, and rotates the rotor by changing the direction of a current in accordance with a rotational angle. Such a BLAC motor has an advantage that torque can be directly controlled and noise is small in comparison to a BLDC (Brushless Direct Current) motor. The shaft 250 may be coupled to the rotor of the BLAC motor to rotate together. However, a BLAC motor requires the sensed component 260, which rotates with the shaft 250, and the sensor 320 that senses a position change of the sensed component 260 in order to sense the rotation position thereof.

The electronic control unit 411 is disposed at another side of the pump housing 220. The electronic control unit 411 is a control circuit board printed with electronic devices for controlling rotation of the motor 230, opening/closing of the solenoid valve, etc. The sensor 320 that senses rotation of the sensed component 260 mounted on the shaft 250 is coupled at a position facing the shaft 250 on the electronic control unit 411.

The shaft 250 is coupled to the motor 230 to rotate. In detail, the end of the shaft 250 which faces the motor 230 is coupled to the rotor of the motor 230 to be able to rotate. A rotating body 251 that operates the pump 240 is coupled to the shaft 250.

When the piston pump 240 that is driven by the reciprocating piston 243 is installed, the rotor 251 may be an eccentric bearing 251 rotating with an area center at a position biased from the rotational axis of the shaft 250. The eccentric bearing 251 is configured to come in contact with and press a pair of pistons 243, which are in contact with both sides of the eccentric bearing 251, respectively, in accordance with a rotational position while rotating with the shaft 250. The piston 243 installed in a direction perpendicular to the rotational axis of the shaft 250 pressurizes and sends a working fluid while reciprocating by the eccentric bearing 251.

When a gear type pump 240 that pressurizes a working fluid using rotation of gears engaged with each other is installed, the rotating body 251 may be a gear having teeth engaged with a driven gear 330 of the pump 240.

The shaft 250 according to an embodiment of the present disclosure extends toward the electronic control unit 411. The shaft 250 may be a single body coupled to the rotor of the motor 230 and axially elongated. The end of the shaft 250 which faces the electronic control unit 411 is disposed sufficiently close to the electronic control unit 411 so that magnetism of the sensed component 260 mounted at an end of the shaft 250 can be transmitted to the sensor 320.

The pump 240 is installed in the pump housing 220, and the suction channel 241 connected with the suction port 221 and the discharge channel 242 connected with the discharge port 223. The suction port 221 and suction channel 241, the discharge port 223 and discharge channel 242, and the suction channel 241 and discharge channel 242 are each configured to be selectively connected by hydraulic pressure. The suction channel 241 and the discharge channel 242 may be thin cylindrical pipelines, but are not limited thereto and may be chambers having a large cross-sectional area. The pump 240 is disposed in a pair at the left and right sides of the rotational axis of the shaft 250 and may be configured such that the piston 243 included therein moves inside and outside every time the rotating body 251 coupled to the shaft 250 is rotated by 180 degrees.

Further, according to an embodiment of the present disclosure, a plurality of pumps 240 may be provided to be spaced apart from each other in a direction perpendicular to the axial direction of the shaft 250.

The pump 240 has a counterpart that reciprocates or rotates while being in contact with the rotating body 251 installed on the axis of the shaft 250. The counterpart may be disposed in a direction perpendicular to the rotational axis of the shaft 250. In this embodiment, the counterpart may be the piston 243 reciprocating while being in contact with the eccentric bearing 251 rotating with the shaft 250 when the pump 240 is a piston pump 240. The pump 240 may be installed in a direction perpendicular to the rotational axial direction of the shaft 250.

In the piston pump 240, referring to FIG. 2, a spherical body 246 is installed in an opening on the movement axial line of the suction channel 241 formed at the piston 243. The spherical body 246 is supported by a spring 245 to come in close contact with a retainer 244 mounted at the front end of the piston 243. The piston pump 240 is configured such that the suction channel 241 can be opened/closed by elasticity of the spring 245 which is applied to the spherical body 246 and the pressure of oil passing through the suction channel 241.

In the pump 240, the maximum pressure may be higher at the discharge channel 242 through which a working fluid is compressed and guided at high pressure by operation of the pump 240 than at the suction channel 241 that receives a working fluid from the suction port 221. Accordingly, leakage of a working fluid in the pump more easily occurs usually near the discharge channel 242 and the discharge port 223 of the pump 240.

The pump housing layout for a brake system according to an embodiment of the present disclosure uses the piston pump 240 that is operated by the piston 243 configured to reciprocate while being in contact with the rotating body 251 when the rotating body 251 is rotated. Further, the suction channel 241 is formed at a position closer than the discharge channel 242 from the rotational axis of the shaft 250 in the radial direction of the shaft 250.

The pump housing layout for a brake system according to an embodiment of the present disclosure uses the piston pump 240 that is operated by the piston 243 configured to reciprocate while being in contact with the rotating body 251 when the rotating body 251 is rotated. In this case, the suction channel 241 of the pump 240 is formed at a position closer than the discharge channel 242 from the sensed component 260 in the rotational axial direction of the shaft 250. For example, as in FIG. 2, the suction channel 241 may be formed to be hollow toward the electronic control unit 411 and the discharge channel 242 may be formed to be hollow toward the electronic control unit 411 at a position further spaced than the suction channel 241 in the radial direction of the shaft 250. The suction port 221 and the discharge port 223 of the pump housing 220 which are connected with the suction channel 241 and the discharge channel 242 are also formed at positions corresponding thereto.

The pump housing layout for a brake system according to an embodiment of the present disclosure has an effect of preventing a leaking working fluid from flowing into the electronic control unit 411 along the extending shaft 250 by disposing the discharge channel 242, at which the possibility of leakage of a working fluid is high, to be spaced from the shaft 250 further than the suction channel 241.

Figure 3:
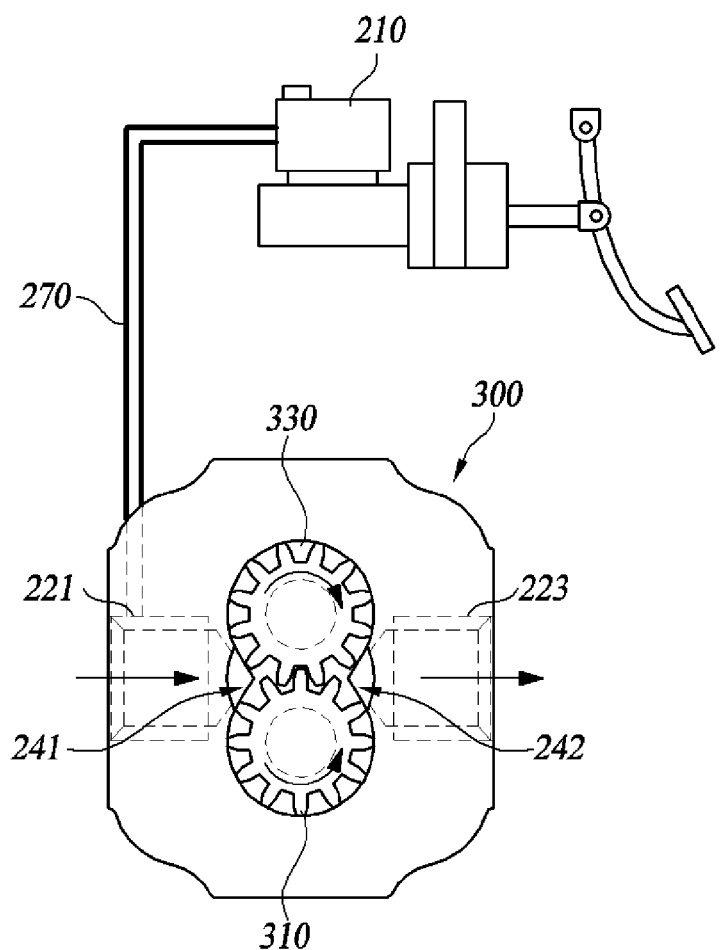
FIG. 3 is a cross-sectional view showing an oil-reservoir pipeline of a pump housing layout for a brake system according to another embodiment of the present disclosure.

The pump 240 is not limited to the piston pump 240. Referring to FIG. 3, for example, the pump 240 according to an embodiment of the present disclosure may be a gear pump 300 that sends a working fluid using a driving gear 310 coupled to the shaft 250 to rotate and a driven gear 330 rotating in mesh with the driving gear 310. The suction port 221 and the discharge port 242 may be disposed on circumferential contact surfaces having the rotational axes of the driving gear 310 and the driven gear 330 as centers, respectively. An inlet port and an outlet port of the gear pump may be understood as an inlet-side chamber and an outlet-side chamber, respectively, in the present disclosure. In FIG. 3, the forming direction of the oil-reservoir is freely shown and is not limited to the direction shown in the figure.

The suction port 221 is disposed at a position closer to the sensed component 260 than the discharge port 223. In detail, the suction port 221 may be formed at a position closer than the discharge port 223 from the sensed component 260 in the rotational axial direction of the shaft 250. There is an effect of preventing a leaking working fluid from flowing into the electronic control unit 411 by the extending shaft 250 by disposing the discharge port 223, at which the possibility of leakage of a working fluid is high, to be spaced from the shaft 250 further than the suction port 221.

Accordingly, in the layout of the pump housing 220 of a brake system according to an embodiment of the present disclosure, the suction channel 241 is connected with the oil reservoir 210 so that a high-pressure working fluid can be guided to the oil reservoir 210 without leaking out of the pump housing 220. Further, there is an effect of preventing oil from leaking to the electronic control unit 411 in multiple steps by disposing the discharge channel 242 to be spaced from the sensed component 260 or the shaft 250 further than the suction channel 241.

According to an embodiment of the present disclosure, a plurality of pumps 240 may be installed to be spaced apart from each other in the rotational axial direction of the shaft 250. It may be possible to apply connection structure with the oil reservoir 210, the disposition of channels, etc. described above to only one or a pair of pumps 240 positioned close to the sensed component 260 of the shaft 250 of the plurality of pumps 240.

The shaft 250 of the pump housing layout according to an embodiment of the present disclosure extends toward the electronic control unit 411 and the sensed component 260 is mounted at the end of the shaft 250 which faces the electronic control unit 411. Further, a rotation sensor 320 that senses rotation of the sensed component 260 is installed at a position facing the sensed component 260 on the electronic control unit 411. Accordingly, it is not required to additionally secure a space in order to install a device for monitoring rotation of the shaft 250 using the BLAC motor 230.

The sensed component 260 is made of a magnetic material. The center of the rotation sensor 320 determines the rotational position of the motor 230 on the basis of a change in magnetic flux that is sensed in accordance with rotation of the sensed component 260 having magnetism.

Figure 4:
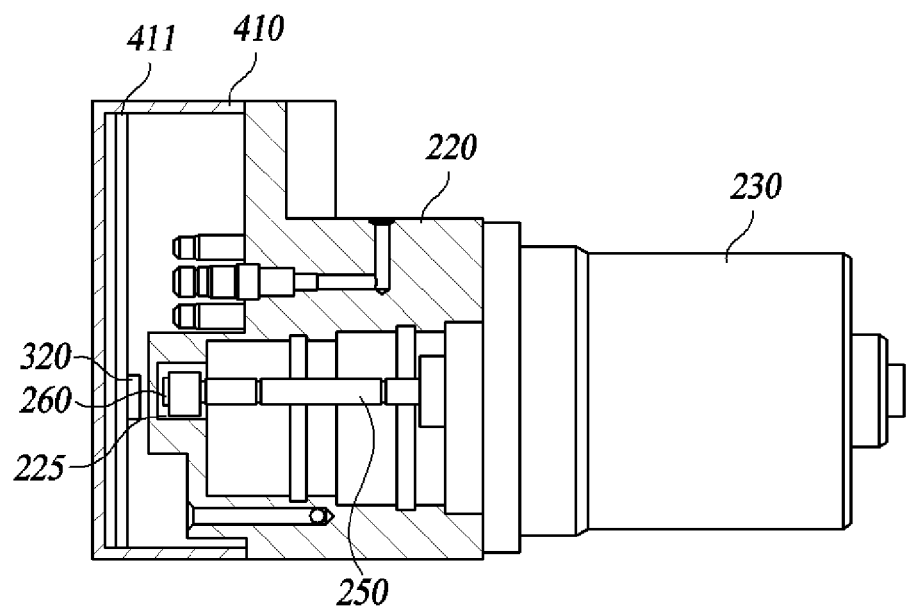
FIG. 4 is a cross-sectional view of the pump housing layout for a brake system according to an embodiment of the present disclosure.
Figure 5:
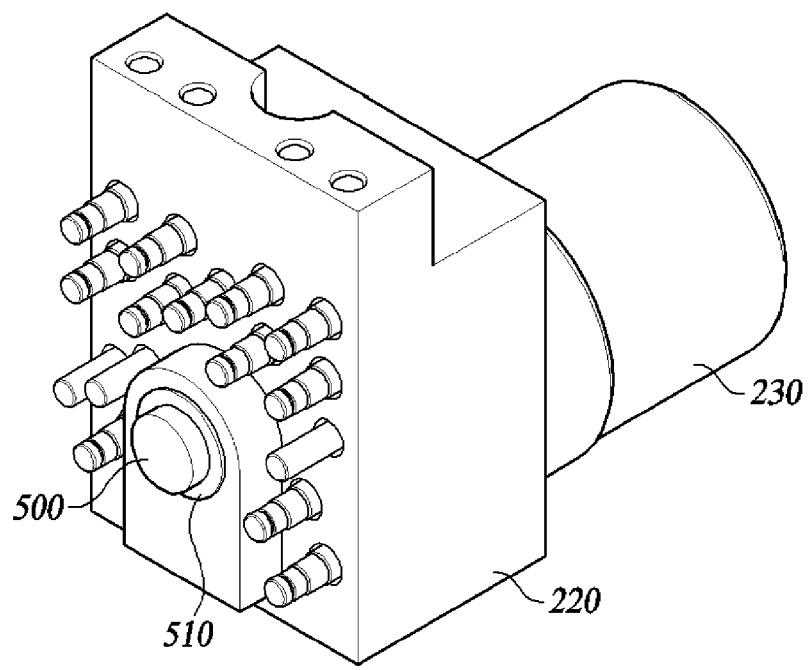
FIG. 5 is a perspective view showing a cover of the pump housing layout for a brake system according to an embodiment of the present disclosure.
Figure 6:
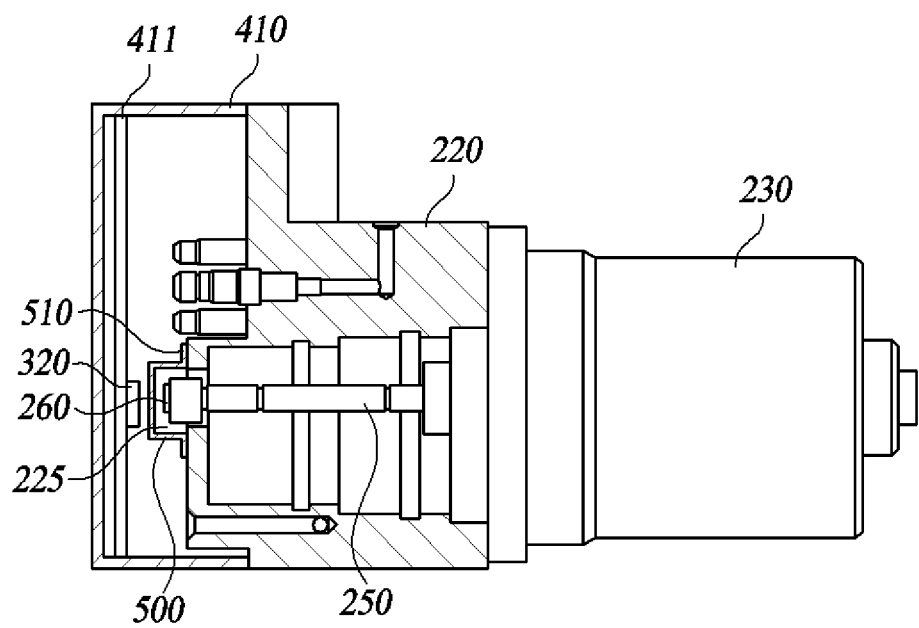
FIG. 6 is a cross-sectional view showing the cover of the pump housing layout for a brake system according to an embodiment of the present disclosure.

Referring to FIGS. 4 to 6, the electronic control unit 411 according to an embodiment of the present disclosure is separated from the inside of the pump housing 220 and disposed outside the pump housing 220. This is for preventing a working fluid from leaking to the electronic control unit 411 from the inside of the pump housing 220.

The pump housing 220 according to an embodiment of the present disclosure has an inner space 225 therein for accommodating the shaft 250. The inner space 225 is not formed in the electronic control unit 411. That is, the inner space 225 is formed with a predetermined thickness remaining at a position facing the sensed component 260 on the wall facing the electronic control unit 411 of the pump housing 220. In this case, the pump housing 220 may be made of a material having high permeability at the entire portion or a portion facing the sensed component 260 so that the magnetism of the sensed component 260 can be sensed by the rotation sensor 320 installed at the electronic control unit 411. The surface facing the sensed component 260 is for preventing leakage of oil by separating the pump housing 220 and the electronic control unit 411, so it can be formed to be sufficiently thin.

Unlike the above description, in the pump housing 220 according to an embodiment of the present disclosure, an inner space 225 may be formed in the electronic control unit 411. Further, a cover 500 that covers the inner space 225 at the electronic control unit 411 may be provided to separate the electronic control unit 411 and the inside of the pump housing 220.

A flange portion 510 coupled to the outer surface of the pump housing 220 is formed at the cover 500 according to an embodiment of the present disclosure. Since the flange portion 510 is formed at the cover 500, it is possible to easily couple the cover 500 and the pump housing 220 by welding the flange portion 510 and the pump housing 220 or using a screw, etc. Further, since the flange portion 510 is in close contact with the wall of the pump housing 220, there is an effect of preventing a working fluid from leaking from the inside of the pump housing 220.

The sensed component 260 and a portion of the shaft 250 may extend toward the electronic control unit 411 through the pump housing 220. In this case, the inner circumferential surface of the cover 500 may be machined in a cylindrical shape spaced a predetermined gap from the outer circumference of the shaft 250 such that the portion protruding toward the electronic control unit 411 can be accommodated and rotated.

Accordingly, even if a working fluid leaking from the pump 240 flows along the shaft 250 rotating in the pump housing 220, it is possible to prevent the working fluid from leaking out of the electronic control unit 411.

As described above, according to this embodiment, the pump housing layout for a brake system according to the present disclosure has an effect of preventing a working fluid from leaking to the electronic control unit from the pump housing by connecting the suction channel of the pump to the oil reservoir.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A pump system for a brake system, comprising:
   an oil reservoir;
   a pump housing having a suction port, a discharge port and an inner space;
   a motor positioned at a first side of the pump housing;
   an electronic control unit positioned at a second side of the pump housing opposite to the first side;
   a pump housed at the pump housing and having (1) a suction channel connected to the suction port of the pump housing and (2) a discharge channel connected to the discharge port of the pump housing;
   a shaft accommodated at the inner space of the pump housing, coupled to and extending from the motor toward the electronic control unit, and configured to be rotated by the motor, the shaft having a rotating body configured to operate the pump and a first end facing the electronic control unit;
   a sensed component disposed at the first end of the shaft;
   a sensor disposed on the electronic control unit, spaced apart and facing the sensed component, and configured to sense rotation of the sensed component;
   a cover disposed between and spaced apart from the sensed component and the sensor and attached to the pump housing to separate the inner space of the pump housing from the electronic control unit; and
   a pump-reservoir pipeline configured to connect the suction channel to the oil reservoir,
   wherein the cover is separated from the electronic control unit and comprises:
      a sidewall surrounding a portion of the shaft protruding outwardly from an outer surface of the pump housing;
      a flange connected to and surrounding a bottom portion of the sidewall and attached to the outer surface of the pump housing; and
      a top wall connected to and surrounded by a top portion of the sidewall and positioned between the sensed component and the sensor.

2. The pump system of claim 1, wherein the pump comprises a piston in contact with the rotating body and configured to reciprocate.

3. The pump system of claim 1, wherein the pump comprises a piston in contact with the rotating body and configured to reciprocate when the rotating body is rotated.

4. The pump system of claim 1, wherein the rotating body comprises a driving gear.

5. The pump system of claim 4, wherein a distance in a rotational axial direction of the shaft between the suction port and the sensed component is smaller than that between the discharge port and the sensed component.

6. The pump system of claim 1, wherein the pump comprises a plurality of pumps spaced apart from each other in a direction perpendicular to an axial direction of the shaft.

7. The pump system of claim 1, wherein the electronic control unit is separated from an inside of the pump housing and positioned externally to the pump housing.

* * * * *